US011313339B2

(12) United States Patent
Bair

(10) Patent No.: US 11,313,339 B2
(45) Date of Patent: Apr. 26, 2022

(54) MOTOR STARTING ASSEMBLY

(71) Applicant: Leo Bair, Woodland, CA (US)

(72) Inventor: Leo Bair, Woodland, CA (US)

(*) Notice: Subject to any disclaimer, the term of this patent is extended or adjusted under 35 U.S.C. 154(b) by 218 days.

(21) Appl. No.: 15/931,281

(22) Filed: May 13, 2020

(65) Prior Publication Data

US 2021/0355902 A1 Nov. 18, 2021

(51) Int. Cl.
*F02N 11/12* (2006.01)
*B25F 3/00* (2006.01)
*B25B 33/00* (2006.01)
*B23B 45/00* (2006.01)
*B25B 21/00* (2006.01)

(52) U.S. Cl.
CPC ............... *F02N 11/12* (2013.01); *B25F 3/00* (2013.01); *B23B 45/003* (2013.01); *B23B 2231/06* (2013.01); *B25B 21/007* (2013.01); *B25B 33/005* (2013.01)

(58) Field of Classification Search
CPC ........ F02N 11/12; F02N 11/14; F02N 15/022; F02N 15/023; B23B 49/005; B23B 49/006; B23B 45/003; B23B 2231/06; B25B 21/007
USPC ..................................... 123/179.26
See application file for complete search history.

(56) References Cited

U.S. PATENT DOCUMENTS

| | | | |
|---|---|---|---|
| 1,496,211 A * | 6/1924 | Densmore ............. | F02N 15/023 74/9 |
| D167,769 S | 9/1952 | Phelps | |
| 2,901,911 A * | 9/1959 | Duncan ................... | F16D 41/22 74/7 R |
| 3,537,436 A | 11/1970 | Heisler | |
| 3,596,647 A | 8/1971 | Heisler | |
| 3,645,247 A * | 2/1972 | D'Ambrosio ...... | A01D 34/6818 123/179.26 |
| 3,656,599 A * | 4/1972 | Diggs ..................... | F16D 43/22 192/42 |
| 3,885,544 A * | 5/1975 | Pfeiffer ................. | F16D 41/067 123/179.26 |
| 4,365,596 A | 12/1982 | Bennett, Sr. | |
| 4,372,263 A | 2/1983 | Costa | |
| 4,399,782 A | 8/1983 | Shelley | |
| 4,569,315 A * | 2/1986 | Bodnar ................... | F02N 11/12 123/179.26 |
| 4,615,311 A * | 10/1986 | Scheckel ................. | F02N 11/12 123/179.24 |

(Continued)

FOREIGN PATENT DOCUMENTS

WO WO2005012722 2/2005

*Primary Examiner* — Phutthiwat Wongwian
*Assistant Examiner* — Arnold Castro

(57) ABSTRACT

A motor starting assembly for starting a pull start motor includes a cup that is attachable to a flywheel of a pull start motor. A cylinder is insertable into the cup and the cylinder engages the cup when the cylinder is rotated in a first direction. In this way the cylinder can rotate the crankshaft of the pull start motor for starting the pull start motor. The cylinder disengages the cup when the when the rotational speed of the cup exceeds the rotational speed of the cylinder. In this way the cylinder facilitate the pull start motor to run without rotating the cylinder. An adapter is releasably attachable to the cylinder and a power drill thereby facilitating the power drill to rotate the cylinder when the power drill is turned on for starting the pull start motor.

9 Claims, 5 Drawing Sheets

(56) References Cited

U.S. PATENT DOCUMENTS

| | | | | |
|---|---|---|---|---|
| 5,345,900 | A * | 9/1994 | Wisegerber | F02N 3/02 |
| | | | | 123/179.24 |
| 6,595,090 | B1 * | 7/2003 | McQuillin | B25B 27/0035 |
| | | | | 123/179.26 |
| 7,530,340 | B1 * | 5/2009 | Jellinek | F02N 11/10 |
| | | | | 123/179.1 |
| 8,490,592 | B1 * | 7/2013 | Von Tiergen | F02N 11/12 |
| | | | | 123/179.25 |
| 9,587,615 | B2 | 3/2017 | Koehler | |
| 2005/0016811 | A1 | 1/2005 | Cooper | |
| 2007/0240664 | A1 * | 10/2007 | Thomas | F02N 11/12 |
| | | | | 123/179.27 |
| 2008/0121489 | A1 * | 5/2008 | Chevalier | F16D 3/72 |
| | | | | 192/105 BB |
| 2009/0255502 | A1 * | 10/2009 | Cook | F02N 15/027 |
| | | | | 123/185.3 |
| 2016/0230738 | A1 * | 8/2016 | Koehler | F02N 15/022 |
| 2018/0195484 | A1 * | 7/2018 | Koehler | F02N 11/12 |
| 2018/0209391 | A1 * | 7/2018 | Ma | F02N 11/12 |
| 2019/0101092 | A1 * | 4/2019 | Meyer | F02B 63/02 |
| 2020/0362809 | A1 * | 11/2020 | Pranger | F02N 11/12 |

* cited by examiner

US 11,313,339 B2

MOTOR STARTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to starting devices and more particularly pertains to a new starting device for starting a pull start motor.

(2) Description of Related Art Including Information Disclosed Under 37 CFR 1.97 and 1.98

The prior art relates to starting devices including a cup and a cylinder that is insertable into the cup and which engages an upper edge of the cup for rotating the cup in a first direction for starting a pull start motor with a power drill. The prior art discloses a starting device that includes a bracket that it mountable to a pull start motor for engaging a power drill and a coupler that couples the power drill to the pull start motor for starting the pull start motor with the power drill. The prior art discloses a variety of two part shafts that have a breakaway connection for using a power drill to start a pull start motor.

BRIEF SUMMARY OF THE INVENTION

An embodiment of the disclosure meets the needs presented above by generally comprising a cup that is attachable to a flywheel of a pull start motor. A cylinder is insertable into the cup and the cylinder engages the cup when the cylinder is rotated in a first direction. In this way the cylinder can rotate the crankshaft of the pull start motor for starting the pull start motor. The cylinder disengages the cup when the when the rotational speed of the cup exceeds the rotational speed of the cylinder. In this way the cylinder facilitate the pull start motor to run without rotating the cylinder. An adapter is releasably attachable to the cylinder and a power drill thereby facilitating the power drill to rotate the cylinder when the power drill is turned on for starting the pull start motor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
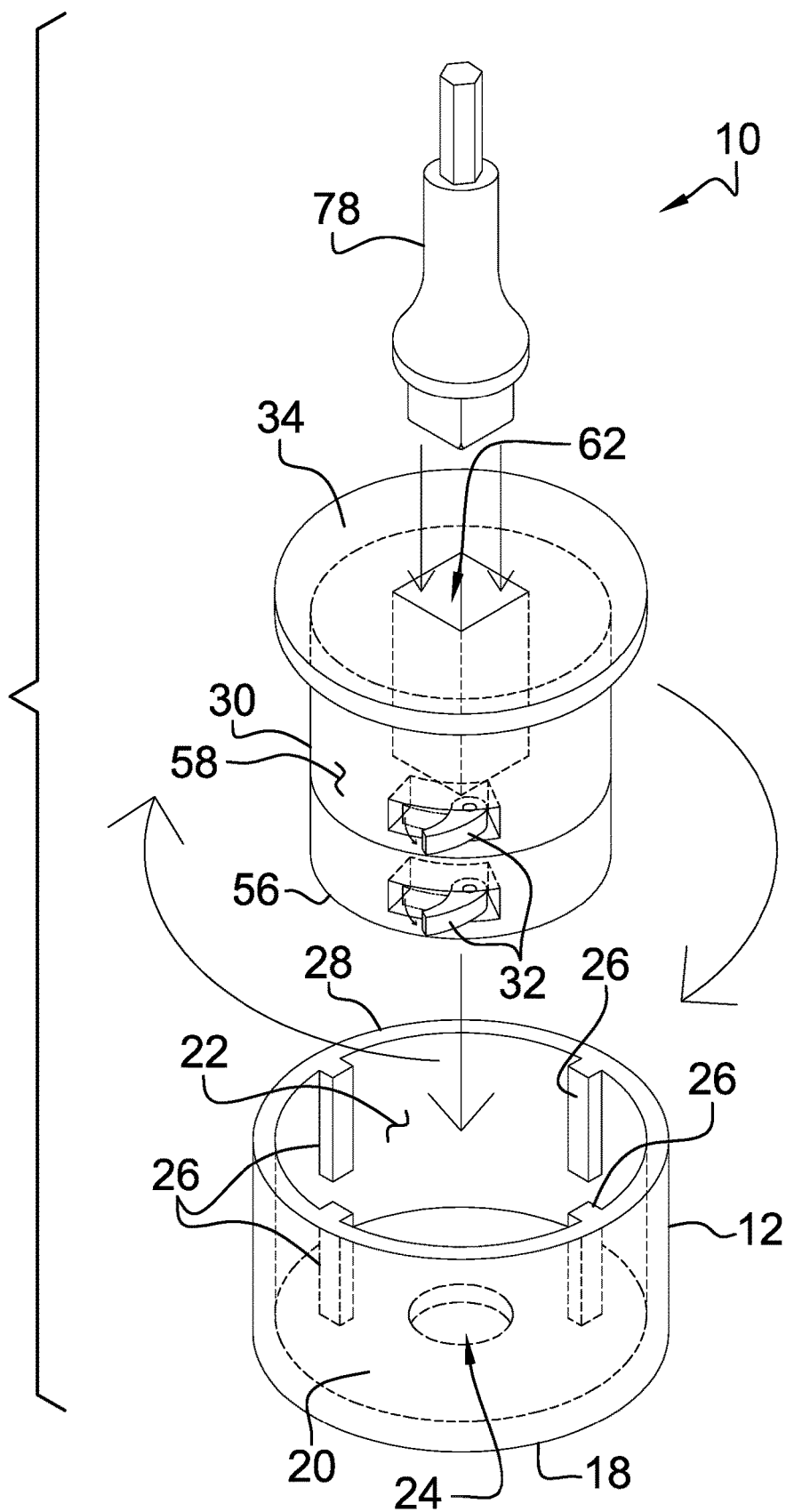
FIG. 1 is an exploded perspective view of a motor starting assembly according to an embodiment of the disclosure.
Figure 2:
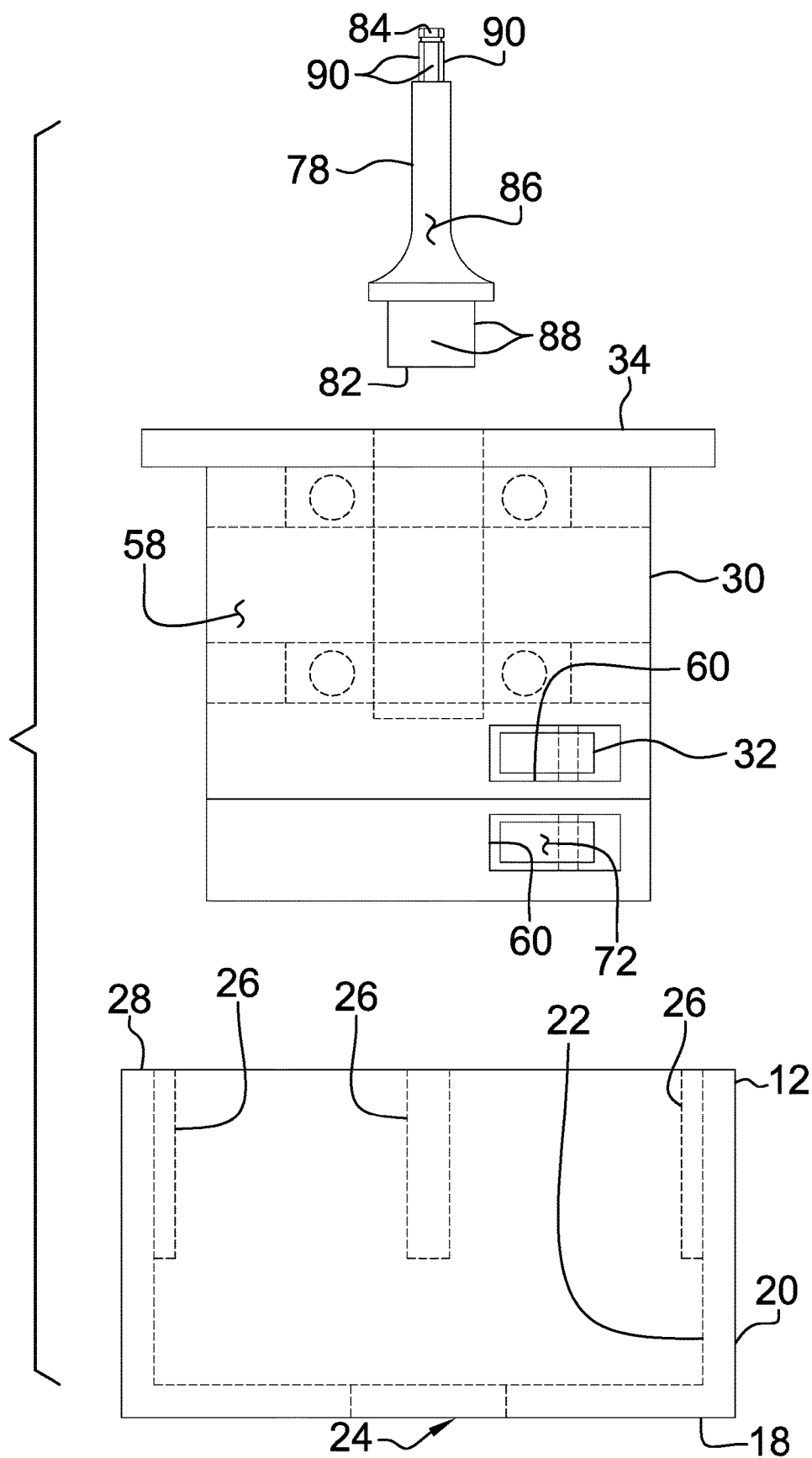
FIG. 2 is a front phantom view of an embodiment of the disclosure.
Figure 3:
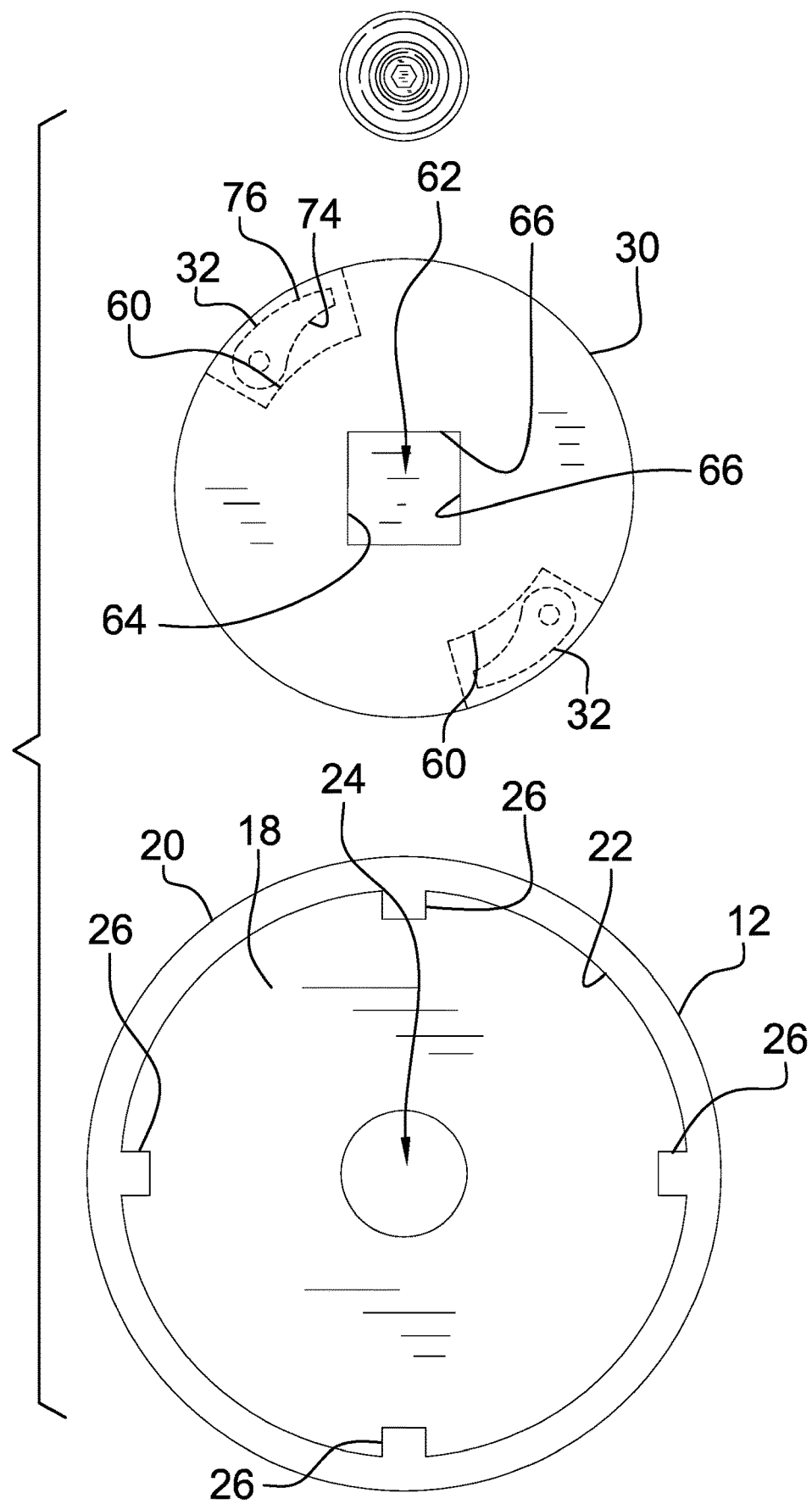
FIG. 3 is a top view of an embodiment of the disclosure.
Figure 4:
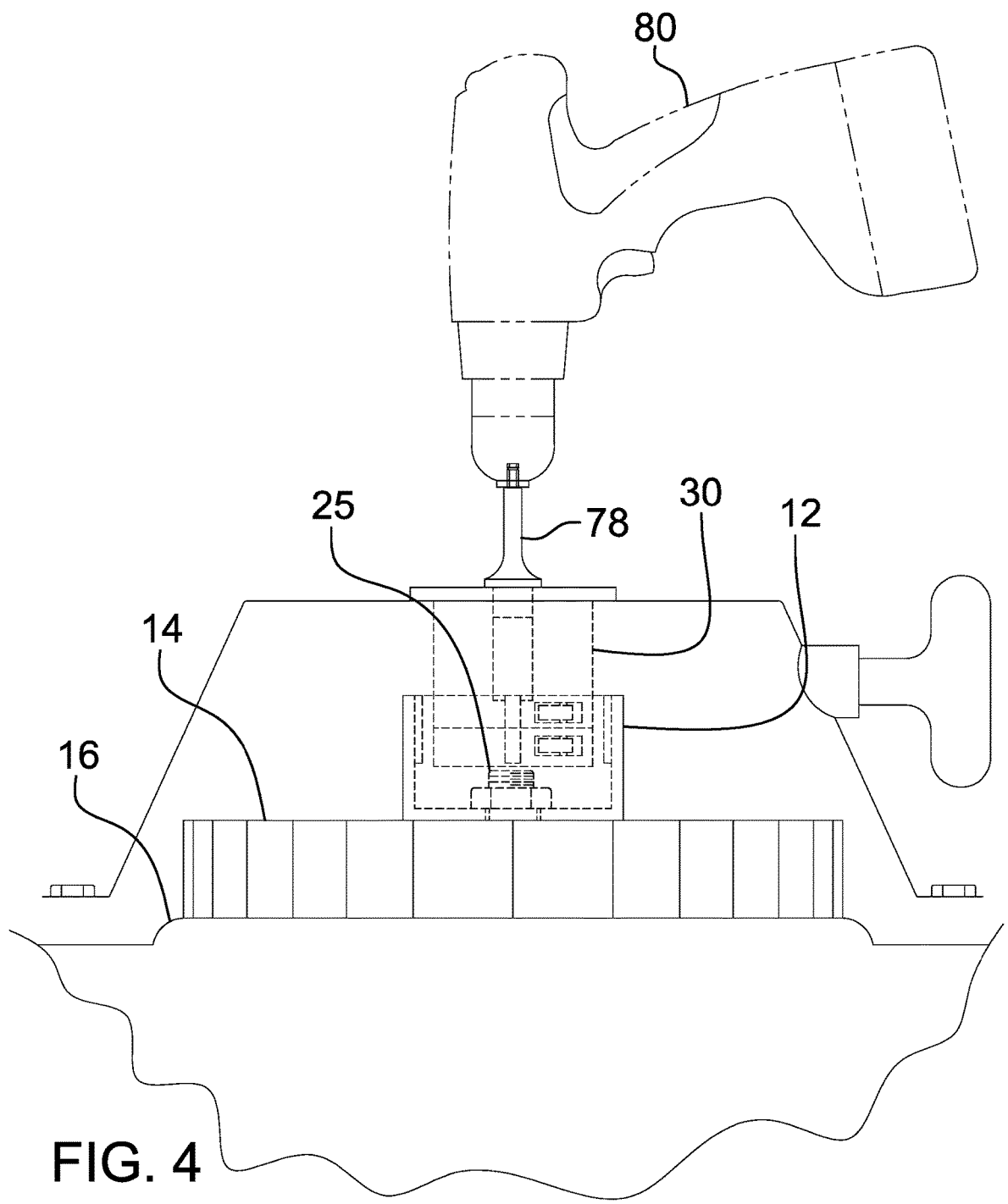
FIG. 4 is a perspective in-use view of an embodiment of the disclosure.
Figure 5:
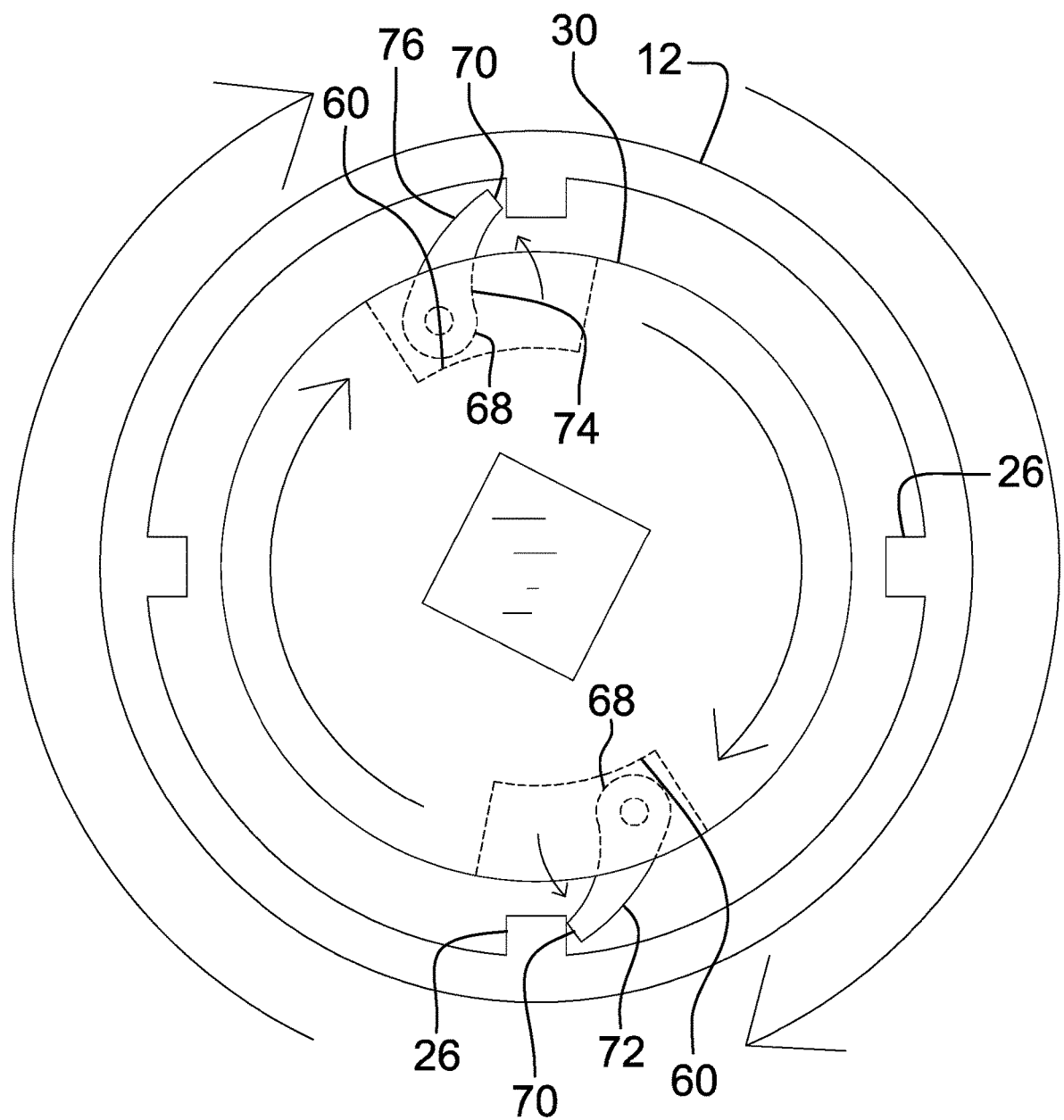
FIG. 5 is a top phantom view of a cylinder of an embodiment of the disclosure.

With reference now to the drawings, and in particular to FIGS. 1 through 5 thereof, a new starting device embodying the principles and concepts of an embodiment of the disclosure and generally designated by the reference numeral 10 will be described.

As best illustrated in FIGS. 1 through 5, the motor starting assembly 10 generally comprises a cup 12 that is attachable to a flywheel 14 of a pull start motor 16. The cup 12 has a bottom wall 18 and an outer wall 20 extending upwardly therefrom, and the outer wall 20 has an inwardly facing surface 22. The bottom wall 18 has an opening 24 extending therethrough for insertably receiving a crankshaft bolt 25 of the pull start motor 16. Additionally, the inwardly facing surface 22 has a plurality of ridges 26 each extending toward a center of the cup 12. Each of the ridges 26 extends between the bottom wall 18 and a distal edge 28 of the outer wall 20, and the ridges 26 are spaced apart from each other and are distributed around the cup 12.

A cylinder 30 is provided that is insertable into the cup 12 and the cylinder 30 has a plurality of engagement being movably disposed thereon. Each of the engagements 32 engages the cup 12 when the cylinder 30 is rotated in a first direction. In this way the cylinder 30 can rotate the crankshaft 25 of the pull start motor 16 for starting the pull start motor 16. Each of the engagements 32 disengages the cup 12 when the when the rotational speed of the cup 12 exceeds the rotational speed of the cylinder 30. In this way the cylinder 30 facilitates the pull start motor 16 to run without rotating the cylinder 30.

The cylinder 30 has a top end 34, a bottom end 56 and an outer surface 58 extending therebetween, and the outer surface 58 has a plurality of engagement wells 60 each extending inwardly therein. The top end 34 has an adapter well 62 extending downwardly therein. The adapter well 62 has a bounding surface 64, and the bounding surface 64 has a plurality of intersecting sides 66 such that the adapter well 62 has a rectangular shape. Each of the engagements 32 has a first end 68, a second end 70 and an outer surface 72 extending therebetween.

The outer surface 72 of the engagements 32 has a front side 74 and a back side 76, and the front side 74 is concavely arcuate between the first end 68 and the second end 70. The back side 76 is convexly arcuate between the first end 68 and the second end 70, and the first end 68 of each of the engagements 32 is pivotally coupled to a bounding surface 64 of the respective engagement well. Each of the engagements 32 is oriented such that an axis extending through the first end 68 and the second end 70 is oriented perpendicular to a rotational axis of the cylinder 30.

The front side 74 is directed to face the rotational direction of the cylinder 30. Each of the engagements 32 is biased into a deployed position having each of the engagements 32 extending outwardly from the respective engagement well 60. In this way the second end 70 of each of the engagements 32 can engage a respective one of the ridges 26 in the cup 12 when the cylinder 30 is rotated. Each of the ridges 26 slides across the back side 76 of each of the engagements 32 when the rotational speed of the cup 12 exceeds the rotational speed of the cylinder 30. In this way each of the engagements 32 retracts into the respective engagement well 60 as the ridges 26 pass over them.

An adapter 78 is provided and the adapter 78 is releasably attachable to the cylinder 30. The adapter 78 is attachable to a power drill 80 thereby facilitating the power drill 80 to rotate the cylinder 30 when the power drill 80 is turned on. In this way the cylinder 30 facilitates the power drill 80 to start the pull start motor 16. The power drill 80 may be a cordless drill or any other type of electrical drill that has a chuck.

The adapter 78 has a primary end 82, a secondary end 84 and an outside surface 86 extending therebetween. The outside surface 86 has a plurality of intersecting sides 88 adjacent to the primary end 82 such that the primary end 82 has a rectangular shape. In this way the primary end 82 conforms to the adapter well 62 in the first end 68 of the cylinder 30. The outside surface 86 has a plurality of intersecting sides 90 adjacent to the secondary end 84 such that the secondary end 84 has a hexagonal shape. In this way the secondary end 84 can be effectively engaged by a chuck on the power drill 80.

In use, the cup 12 is attached to the flywheel 14 of the pull start motor 16 when the pull start motor 16 is being repaired or otherwise maintained. The cylinder 30 is positioned in the cup 12, the adapter 78 is coupled to the power drill 80 and the adapter 78 is inserted into the cylinder 30. In this way the power drill 80 can rotate the pull start motor 16 in order to start the pull start motor 16. Thus, a repair person does not have to manually pull start the pull start motor 16, thereby saving the repair person time and effort. The engagements 32 on the cylinder 30 facilitate the cup 12 to rotate around the cylinder 30, unimpeded, when the pull start motor 16 begins to run. In this way the cylinder 30 can be removed from the cup 12 when the pull start motor 16 is running.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motor starting assembly for starting a pull start motor with an electric drill, said assembly comprising:
    a cup being attachable to a flywheel of a pull start motor;
    a cylinder being insertable into said cup, said cylinder having a plurality of engagements being movably disposed thereon, each of said engagements engaging said cup when said cylinder is rotated in a first direction wherein said cylinder is configured to rotate the crankshaft of the pull start motor for starting the pull start motor, each of said engagements disengaging said cup when said when the rotational speed of said cup exceeds the rotational speed of said cylinder wherein said cylinder is configured to facilitate the pull start motor to run without rotating said cylinder; and
    an adapter being releasably attachable to said cylinder, said adapter being attachable to a power drill thereby facilitating the power drill to rotate said cylinder when the power drill is turned on wherein said cylinder is configured to facilitate the power drill to start the pull start motor.

2. The assembly according to claim 1, wherein said cup has a bottom wall and an outer wall extending upwardly therefrom, said outer wall having an inwardly facing surface, said bottom wall having an opening extending therethrough for insertably receiving a crankshaft bolt of the pull start motor, said inwardly facing surface having a plurality of ridges each extending toward a center of said cup, each of said ridges extending between said bottom wall and a distal edge of said outer wall, said ridges being spaced apart from each other and being distributed around said cup.

3. The assembly according to claim 1, wherein said cylinder has a top end, a bottom end and an outer surface extending therebetween, said outer surface having a plurality of engagement wells each extending inwardly therein, said top end having an adapter well extending downwardly therein, said adapter well having a bounding surface, said bounding surface having a plurality of intersecting sides such that said adapter well has a rectangular shape.

4. The assembly according to claim 3, wherein each of said engagements has a first end, a second end and an outer surface extending therebetween, said outer surface having a front side and a back side, said front side being concavely arcuate between said first end and said second end, said back side being convexly arcuate between said first end and said second end, said first end of each of said engagements being pivotally coupled to a bounding surface of said respective engagement well.

5. The assembly according to claim 4, wherein each of said engagements is oriented having an axis extending through said first end and said second end being oriented perpendicular to a rotational axis of said cylinder, said front side being directed to face the rotational direction of said cylinder.

6. The assembly according to claim 5, wherein each of said engagements is biased into a deployed position having each of said engagements extending outwardly from said respective engagement well thereby facilitating said second end of each of said engagements to engage a respective one of said ridges in said cup when said cylinder is rotated.

7. The assembly according to claim 6, wherein:
said cup has a bottom wall and an outer wall extending upwardly therefrom, said outer wall having an inwardly facing surface, said inwardly facing surface having a plurality of ridges each extending toward a center of said cup, each of said ridges extending between said bottom wall and a distal edge of said outer wall, said ridges being spaced apart from each other and being distributed around said cup; and
each of said ridges slides across said back side of each of said engagements when the rotational speed of said cup exceeds the rotational speed of said cylinder thereby urging each of said engagements to retract into said respective engagement well.

8. The assembly according to claim 7, wherein said adapter has a primary end, a secondary end and an outside surface extending therebetween, said outside surface having a plurality of intersecting sides adjacent to said primary end such that said primary end has a rectangular shape thereby facilitating said primary end to conform to said adapter well in said first end of said cylinder, said outside surface having a plurality of intersecting sides adjacent to said secondary end such that said secondary end has a hexagonal shape wherein said secondary end is configured to be engaged by a chuck on the power drill.

9. A motor starting assembly for starting a pull start motor with an electric drill, said assembly comprising:
a cup being attachable to a flywheel of a pull start motor, said cup having a bottom wall and an outer wall extending upwardly therefrom, said outer wall having an inwardly facing surface, said bottom wall having an opening extending therethrough for insertably receiving a crankshaft bolt of the pull start motor, said inwardly facing surface having a plurality of ridges each extending toward a center of said cup, each of said ridges extending between said bottom wall and a distal edge of said outer wall, said ridges being spaced apart from each other and being distributed around said cup;
a cylinder being insertable into said cup, said cylinder having a plurality of engagement being movably disposed thereon, each of said engagements engaging said cup when said cylinder is rotated in a first direction wherein said cylinder is configured to rotate the crankshaft of the pull start motor for starting the pull start motor, each of said engagements disengaging said cup when said when the rotational speed of said cup exceeds the rotational speed of said cylinder wherein said cylinder is configured to facilitate the pull start motor to run without rotating said cylinder, said cylinder having a top end, a bottom end and an outer surface extending therebetween, said outer surface having a plurality of engagement wells each extending inwardly therein, said top end having an adapter well extending downwardly therein, said adapter well having a bounding surface, said bounding surface having a plurality of intersecting sides such that said adapter well has a rectangular shape;
wherein each of said engagements has a first end, a second end and an outer surface extending therebetween, said outer surface having a front side and a back side, said front side being concavely arcuate between said first end and said second end, said back side being convexly arcuate between said first end and said second end, said first end of each of said engagements being pivotally coupled to a bounding surface of said respective engagement well, each of said engagements being oriented having an axis extending through said first end and said second end being oriented perpendicular to a rotational axis of said cylinder, said front side being directed to face the rotational direction of said cylinder, each of said engagements being biased into a deployed position having each of said engagements extending outwardly from said respective engagement well thereby facilitating said second end of each of said engagements to engage a respective one of said ridges in said cup when said cylinder is rotated, each of said ridges sliding across said back side of each of said engagements when the rotational speed of said cup exceeds the rotational speed of said cylinder thereby urging each of said engagements to retract into said respective engagement well; and
an adapter being releasably attachable to said cylinder, said adapter being attachable to a power drill thereby facilitating the power drill to rotate said cylinder when the power drill is turned on wherein said cylinder is configured to facilitate the power drill to start the pull start motor, said adapter having a primary end, a secondary end and an outside surface extending therebetween, said outside surface having a plurality of intersecting sides adjacent to said primary end such that said primary end has a rectangular shape thereby facilitating said primary end to conform to said adapter well in said first end of said cylinder, said outside surface having a plurality of intersecting sides adjacent to said secondary end such that said secondary end has a hexagonal shape wherein said secondary end is configured to be engaged by a chuck on the power drill.

* * * * *